May 17, 1932.  R. W. CANFIELD  1,859,231
GLASSWARE MAKING APPARATUS
Filed March 30, 1929  2 Sheets-Sheet 2
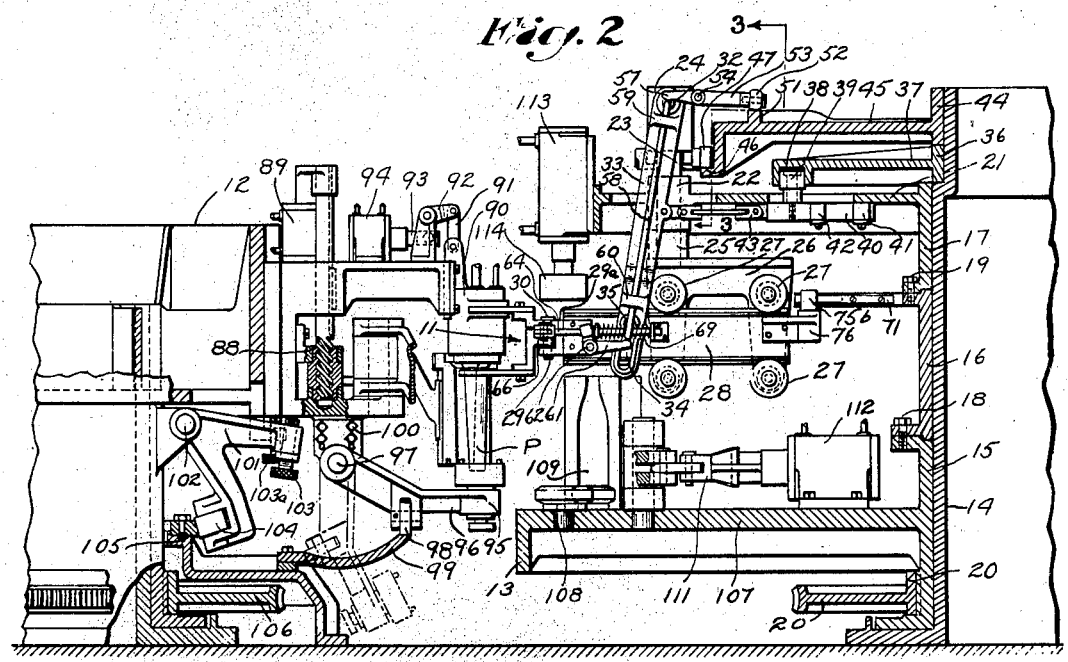
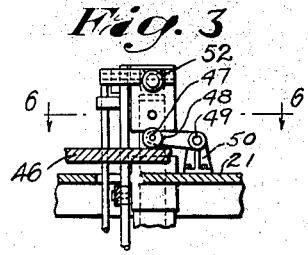
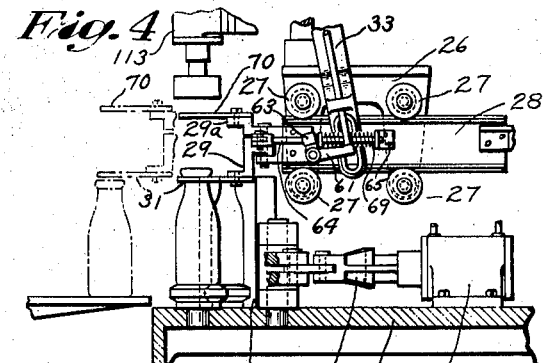
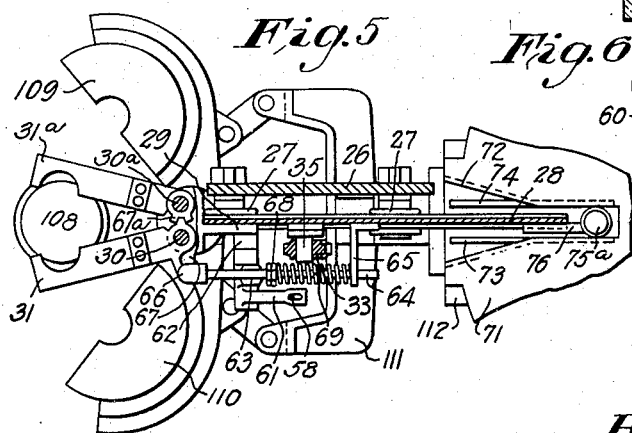
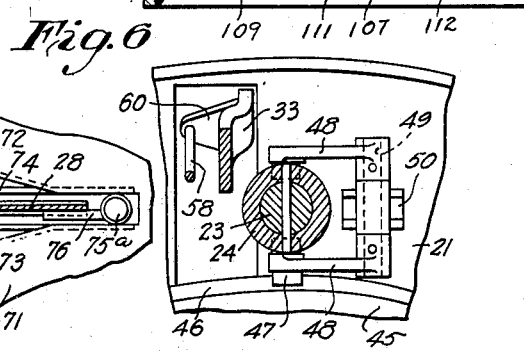
Witness.
W. B. Thayer
Inventor:
Robert W. Canfield,
By Brown & Parham
Attorney Patented May 17, 1932

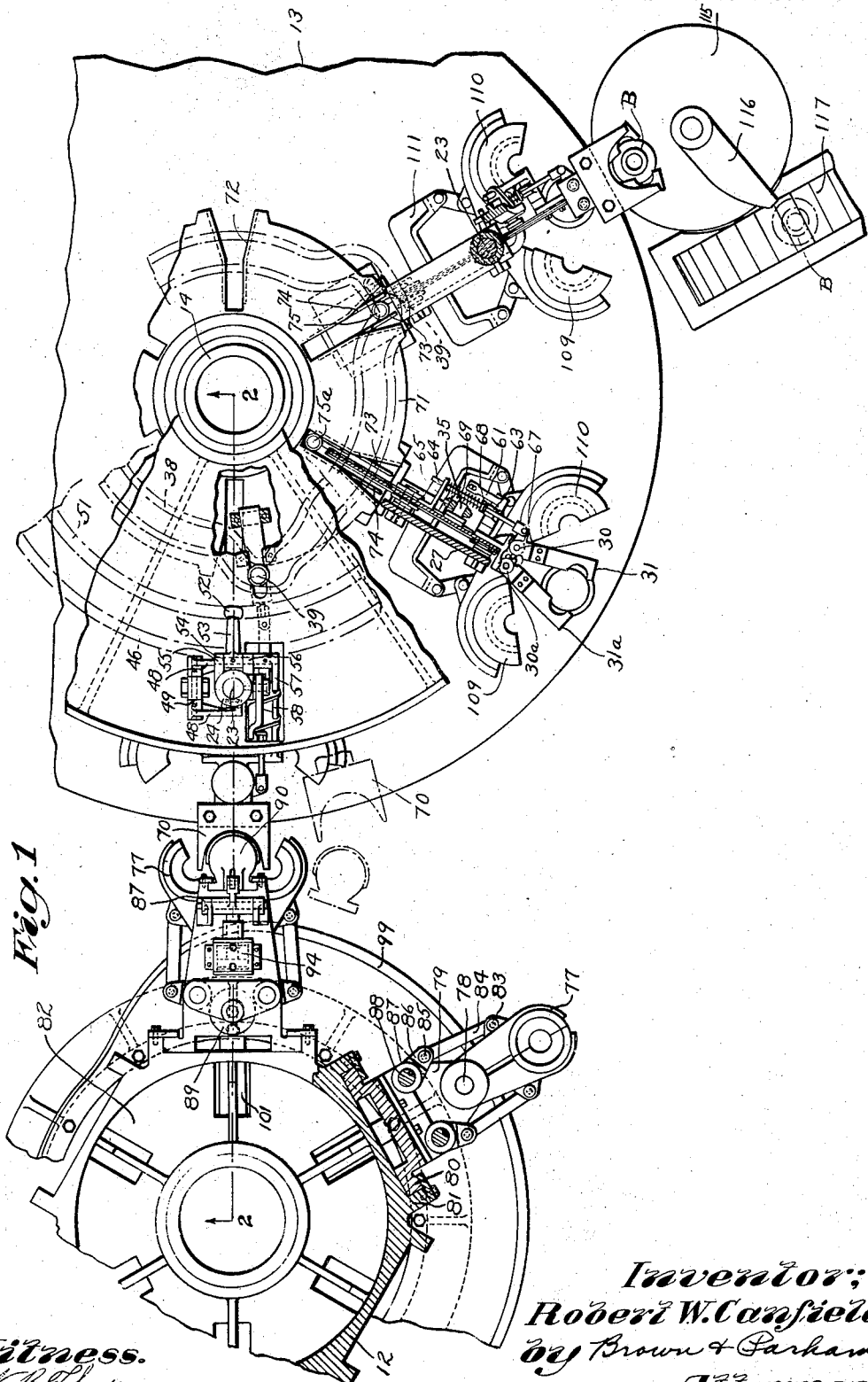

1,859,231

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

GLASSWARE MAKING APPARATUS

Application filed March 30, 1929. Serial No. 351,426.

My invention relates generally to the manufacture of hollow glassware and more particularly to glassware forming apparatus of the type in which the glass for each article is given a preliminary shape in a preliminary or parison forming mold and is then transferred to a finishing mold in which the formation thereof is completed.

Apparatus for the manufacture of hollow glassware may comprise two adjacent tables, arranged to rotate in synchronized relationship, one of said tables carrying a plurality of glass receiving and parison forming units, and the other table carrying a like number of finishing or blow molds.

It has been proposed in a copending application of Karl E. Peiler, Serial No. 323,955 to provide a continuously rotating two-table machine in which the neck ring of a parison mold is at a suitable time moved radially of its own table into coincidence with a traveling finishing mold and caused to travel with the finishing mold for the transfer operation. My invention specifically contemplates the provision of an improved transfer means, in which the neck ring is made integral with the parison mold and separate tongs ere employed to transfer the parison from the parison mold to the finishing mold. The tongs are capable of being mounted upon one of two synchronized continuously rotating tables of the glassware forming apparatus, and capable of following coincidentally the exact path of a mold mounted upon the other table, neither running ahead of nor lagging behind the said associated mold. By my improved means, I am able to maintain such exact coincidence for a relatively long period of time, notwithstanding the fact that the distance between the center of the table supporting the transfer device and the center of the ware contacting portion of the transfer device must constantly change during the interval in with the ware contacting portion is following the path of the associated mold. The features here shown may readily be combined with the structure shown in the aforesaid Peiler application to provide a neck ring transfer with my novel means for assuring coincidence of travel of the neck ring and the blow mold.

One object of the present invention is to provide novel and efficient mechanism for transferring glass parisons from continuously moving parison forming molds to continuously moving finishing molds.

A further object is to provide mechanism for accomplishing such transfer, which may be accurately positioned with regard to the parison mold and the finishing mold, respectively, at the time of its coaction respectively with each.

A further object of the invention is the provision in apparatus of the character described, of a transfer mechanism, mounted upon and carried by the finishing mold table and designed to travel along the path of and be positioned by a parison mechanism, upon an associated mold table and to be maintained in exact coincidence with the mold throughout all the time the parison is being transferred from the parison mold.

A further object of my invention is the provision, in apparatus of the character described, of a transfer mechanism pivotally mounted upon one of the mold tables, and resiliently movable about the pivot, whereby said transfer mechanism may be positioned by a part of forming mechanism mounted on the other table and exactly follow the path of travel of the said forming mechanism.

A further object of my invention is the provision, in apparatus of the character described, of a plurality of transfer units mounted upon and carried by a finishing mold table, each unit cooperating with an associated finishing mold, and being effective to transfer glass parisons from a parison mold to the finishing mold and also being effective to take out completed articles from the finishing mold and deposit them upon associated conveyor apparatus.

A further object is the provision, in apparatus of the character described, of a transfer device comprising tongs, mounted upon the finishing mold table, the tongs being capable of following exactly and coincidentally the center line of an associated parison mold upon an associated parison mold table, notwithstanding the varying distance of the path of movement of the tongs from the center of the finishing mold table.

Further objects will be apparent from the following specification and claims.

I have illustrated one embodiment of the mechanical features of my invention in the accompanying drawings in which:

Figure 1 is a fragmentary plan view of a two-table glassware forming machine embodying the invention, with parts broken away to disclose underlying parts and with other parts shown in horizontal section;

Fig. 2 is a fragmentary vertical section of the forming machine of Fig. 1, taken substantially along the line II—II of Fig. 1, certain portions of such machine being shown in elevation, and other portions broken away for clearness;

Fig. 3 is an enlarged fragmentary sectional view taken substantially along the line III—III of Fig. 2;

Fig. 4 is a fragmentary vertical section through a portion of the finishing mold table, showing one of the finishing molds at a take-out station and illustrating the operation of the associate transfer mechanism during the take-out of an article from a finishing mold;

Fig. 5 is an enlarged view in top plan of one of the finishing molds and the tongs transfer unit associated therewith, shown in Fig. 1; and Fig. 6 is a view in horizontal section of the construction shown in Fig. 3, taken on the line 6—6 of Fig. 3.

In general the apparatus illustrated comprises a continuously rotating parison mold table and a continuously rotating finishing mold table, each table having a plurality of molds mounted thereon. The finishing mold table also carries a plurality of transfer units, there being one transfer unit associated with each finishing mold. The transfer units are designed to act as transfer means to transfer parisons from the parison molds to the associated finishing molds and as take-out means for transferring finished articles from the finishing molds to a take-out table, a buck, or other place of delivery. Each transfer unit comprises a pair of tongs mounted upon a slidable carriage reciprocable substantially radially of the said finishing mold table in a guideway formed by rollers, which guideway is itself mounted for oscillation upon the blow mold table. Suitable cam mechanism is provided for opening the tongs and for allowing the tongs to resiliently close around the parison and finished articles to effect the parison transfer and article take-out. Other cam mechanism serves to move each of said transfer units along its guideway radially outward from the finishing mold table toward the associated parison mold, at the time when the parison mold approaches the transfer position, to return the unit after grasping the parison, and to project and retract the unit adjacent to the take-out position. The cam path for effecting this controlled movement of the cam mechanism is so shaped as to cause the transfer tongs to follow the exact path of the parison mold in exact coincidence with the parison mold and associated with each pair of tongs is a centering head or yoke, which engages a part of the associated parison forming mechanism so that the tongs may be accurately positioned thereby to engage the parison. During the time of coincidence of the transfer tongs with the parison mold, flat springs adjacent to the inner end of the transfer unit allow an acceleration or retardation of the movement of said tongs about the pivot in order to accommodate their speed to that of the parison mold. Immediately after their engagement with the parison, the tongs will be retracted by the cam mechanism and will carry the parison to an open finishing mold in which the tongs will deposit the parison, the position of the tongs at this time being accurately determined by an associated slot or notch on the finishing mold table adjacent the inner end of the transfer apparatus.

Suitable cam mechanism is also provided for lowering and raising the transfer tongs at the proper times in order that during the transfer of the finished article from the finishing mold to the take-out table, the tongs may grasp the neck of the finished article and raise it from the bottom plate.

Referring to the drawings and particularly to Fig. 2 thereof, the apparatus disclosed comprises in general a plurality of transfer devices 11 for transferring glass articles, such as the parison P from parison molds mounted upon a table 12 to cooperating finishing molds mounted upon a finishing mold table 13, and for taking out finished articles from the finishing molds, the transfer devices 11 being mounted on the said table 13 for rotation therewith and for cooperation with the finishing molds.

The finishing mold table includes a stationary post or axle 14, upon which are mounted for rotation the sleeves 15, 16 and 17, joined together by bolts, as at 18 and 19. The sleeves 15, 16 and 17 are rotated by any suitable means, as for example by power applied to the gear wheel 20, the rotation of which causes the rotation of the sleeve 15 and consequently of the sleeves 16 and 17. Connected to or formed integrally with the sleeve 17 is a circular shelf 21, which carries a plurality of vertical sleeves 22, each sleeve being associated with one finishing mold and providing a bearing in which a rod 23 of the transfer unit cooperating with the said finishing mold may slide and turn. Each rod 23 has fastened at its upper end a hub 24, and at its lower end a hub 25, (Fig. 2) which latter hub has mounted thereon a bracket 26 carrying a plurality of rollers 27 adapted to serve as bearings for the slide 28. Brackets 29 and 29a, Fig. 4, are fastened to the outer end of each slide 28. Each bracket 29 carries vertical pivot pins 30 and 30a (Fig. 1) on which are mounted the members 31 and 31a of tongs for grasping a parison while it is held in an associated parison forming mechanism and for supporting the said parison during the transfer thereof to a finishing mold and also for supporting finished ware during the take-out operation.

Suitable mechanism is provided for reciprocating the tongs radially of the finishing mold table. The hub 24 of each rod 23 carries a horizontal pivot 32 for an arm 33. (See Fig. 2.) Each arm 33 has at its lower end a slot 34 arranged to receive a pin 35 which is fastened to the slide 28. The post 14 carries, above the rotatable sleeve 17, a stationary sleeve 36 provided with a web or shelf 37 which has circumferentially thereof a cam groove or path 38. A cam roller 39, mounted upon a horizontal slide 40, is adapted to cooperate with the cam groove 38. The slide 40 is mounted on supports 41 and 42, on the rotary table member 21 for horizontal sliding movement and is connected by the universal joint 43 to the arm 33, whereby movement of the roller 39, caused by the contour of the cam 38, is adapted to reciprocate the associated arm 33 radially for the purpose of projecting or retracting the tongs 31 and 31a, at the desired times for the transfer of parisons from the parison forming mechanism to the finishing mold and for the transfer of finished articles therefrom to the takeout table. As is clearly shown by the broken lines in Fig. 1, the cam groove 38 is so shaped that the grasping center of the tongs members 31 and 31a may exactly register with the center of parisons held in the parison forming mechanism and this registration will be exactly maintained for an appreciable interval during which the parison may be transferred from the parison forming mechanism, notwithstanding the changing speed due to the varying radius of rotation of the said center of the tongs members 31 and 31a. Similarly, cam groove 38 also is shaped to effect radial outward movement of the tongs at the takeout station as is illustrated in Fig. 1.

Means are also provided for raising and lowering the transfer tongs and may comprise a second stationary sleeve 44 positioned upon the post 14 above the stationary sleeve 36 and provided with a circular web or shelf 45 carrying a downwardly turned flange near the circumference thereof, upon the lower portion of which flange is an outwardly turned cam surface 46 adapted to coact with cam rollers 47. As shown more clearly in Figs. 1, 3 and 6, each cam roller 47 is mounted upon one arm of a yoke 48 pivoted at 49 on the bracket 50, which is in turn mounted upon the shelf 21. The yoke 48 embraces the rod 23 below the hub 24 and is thus adapted to support the hub 24 and by means thereof the rod 23. Therefore, the cam path 46 controls through the cam rollers 47 and the yokes 48 the vertical position and the vertical movements of the sliding rods 23. By this means the tongs may be lowered to lower the ware into the finishing mold or to lift it from the bottom plate thereof for transfer to the takeout table.

Means are also provided for opening and closing the transfer tongs and include a cam path 51 formed as a flange upon the shelf 45 and cam followers 52 mounted on levers 53. Each of the levers 53 is pivoted at 54 (Fig. 1) between the lugs 55 and 56, which are mounted upon the hub 24. The working arm 57 of each lever 53 bears upon the top of a rod 58 that is slidable through lugs 59 and 60 (Fig. 2) which are formed upon the associated lever arm 33. Bell crank levers 61, each having one end contacting with the lower end of one of the rods 58 and each being pivoted upon one of the pins 62 which protrude from the brackets 29, are arranged to be actuated by said rods 58. Each lever 61 carries at its opposite or working end a yoke 63, (Fig. 1) which embraces a horizontal rod 64 loosely mounted in the bracket 65 secured upon the associated slide 28, the rod 64 being fastened at its outer end at 66 to a short lever arm 67 on the tongs member 31. Each set of tongs members 31 and 31a are geared together as indicated at 67a (Figs. 1 and 5) whereby opening or closing movement of the tongs member 31 causes the simultaneous opening or closing movement of the tongs member 31a. Centrally of each rod 64 is a projection 68, upon which the yoke 63 is designed to bear and a spring 69 is interposed between each projection 68 and the associated bracket 65 to continuously urge the rod outward. Movement of one of the levers 53 induced by the cam 51 causes movement of the associated rod 58 downward and through the lever 61 moves the associated rod 64 inward against the action of the spring 69 to open its associated tongs members 31 and 31a. When the cam 51 allows any cam follower 52 to fall, the spring 69 is permitted to push the rod 64 outward and thus resiliently to close the associated tongs gripping members 31 and 31a.

Additional means are provided for guiding the tongs members in their travel, so that at the time of coaction with the parison mold, they will be positioned by means mounted on the parison mold table, and at the time of coaction with the finishing mold, they will be positioned by means mounted upon the finishing mold table, whereby the parison may be gripped by the gripping tongs precisely as desired in taking it out from the parison mold and the parison transported by the tongs may be delivered precisely as desired into the finishing mold. Each of the brackets 29a, mounted upon one of the slides 28, carries a centering head 70 which is adapted to embrace the head for the parison mold at the proper time and thus to guide the tongs gripping members 31 and 31a to the exact position to grip the parison while it is held in the parison forming mechanism. A shelf 71, Figs. 1 and 2, is secured to the sleeve 16 and has a plurality of slots 72, one slot being provided for and associated with each of the transfer units. The inner or reduced portions of the slots 72 are formed with substantially straight parallel sides, while the outer portions thereof flare in the shape of a Y. Fastened to the sides of each slot 72 adjacent the outer portion thereof, are a pair of flat springs 73 and 74, which form a substantially straight line continuation of the reduced portion of the said slot 72. Rollers indicated respectively at 75, 75a and 75b for the three units shown in Fig. 1 are secured upon brackets 76 in turn fastened upon the slides 28, and are adapted to be received by the slots 72 between the springs 73 and 74. Inasmuch as the sliding supports 28 are carried in the brackets 26, which may turn only with the rods 23 and about the axis thereof, when any roller 75, 75a or 75b is positioned within the inner portion of the slot 72, all turning of the slide is rendered impossible, because of the rigid sides of the associated slot. Thus, when any roller 75, 75a or 75b is near to or at its inner position, similar to the position of the roller 75a (Fig. 1), movement about the associated pivot rod 23 is prevented and the tongs members are positioned precisely relative to the table 13, whereby the parison will be placed exactly within the finish mold. However, when a roller 75, 75a or 75b is near the outer end of the slot, such as the position of the roller 75b, there may be a slight movement thereof resiliently opposed by one of the springs 73 or 74, whereby the centering head 70 and the tongs members 31 and 31a may be precisely positioned relative to the parison mold by the coaction of the centering head and the head for the parison mold to grip the parison formed in the parison mold and the precise positioning may be maintained during the interval in which the transfer from the parison forming machine takes place by a controlled retardation or acceleration of the transfer tongs with respect to the travel of the finishing mold.

The sleeve 15 of the finishing mold table has formed therewith a circular shelf 107, upon which is mounted the bottom plates 108 and the halves 109 and 110 of the finishing molds. The halves of each mold are arranged to be opened or closed by suitable linkage, as 111, which is connected to the piston of a horizontal pressure cylinder 112. A vertical pressure cylinder 113 is mounted upon the shelf 21 and adapted to lower the blow head 114 for coaction with the finishing mold and to raise the said blow head for allowing the transfer of a parison to the finishing mold and the removal of the finished article from the finishing mold.

The parison mold table 12 carries a plurality of parison molds 77 and is adapted to be rotated in a generally horizontal plane (Fig. 1). Each mold is mounted at 78 upon a vertically slidable support 79. Each of the supports 79 is formed with a flanged portion 80, which is shaped to slide in a vertical guideway 81 on the rotating turret 82 of the parison mold table. The molds 77 are made in halves pivoted at 78 and each half has fastened thereto at 83 a link 84, connected at 85 to a lever 86 mounted upon a threaded rock hub or nut 87 formed to engage the spirally threaded vertically movable rod 88. The latter and the associated threaded nut for actuating one-half of the mold may have right hand threads while those of the other half have left hand threads. Each pair of spirally threaded rods 88 are arranged to be reciprocated vertically by a pressure cylinder 89 and intermediate motion transmitting elements, as is shown more clearly in Fig. 2 and by their reciprocation turn the associated threaded nuts 87 and open or close the halves of the mold.

The halves of each mold 77 are so formed that the mold has an integral finish, that is, there is no separate neck ring, the finish or neck portion of the bottles being formed by the mold halves in the same manner as the rest of the parison being formed. A combined blow and suction head 90 is provided for each parison mold and is arranged to be lowered or raised through a link 91 and a bell crank lever 92 by the operation of a piston 93 in a pressure cylinder 94. A neck pin (not shown) is contained within and supported by the combined head 90 and preferably is arranged to be drawn downward by suction to coact with the mold in the initial formation of the parison and to be urged upward by pressure to allow the application of pressure fluid to the glass. A bottom plate 95 for each parison mold is supported upon an arm 96, pivoted at 97, on one of the mold supports 79 and each arm 96 also carries a cam roller 98 arranged to travel upon a cam path 99. The position of the bottom plate relative to the parison mold may be adjusted by screws 100.

The raising and lowering of the entire suction unit for the purpose of clearing the walls of an associated gathering pool is controlled by the bell crank lever 101, pivoted at 102 on the hub of the turret 82, which lever bears upon the lower side of the parison mold support through an adjusting screw 103 and carries a roller 104 adapted to travel along a cam path 105. I provide means for vertically positioning the parison mold whereby it registers with the centering head 70 at the time of coaction therewith, independent of the adjustment of the adjusting screw 103 and of wear upon the cam 105. Adjusting screws 103a are mounted upon brackets on the rotating turret 82 and serve to limit the lowermost position of the suction units to position the parison mold heads in registration with the centering heads 70 and cause the tongs 31 and 31a to grasp parisons correctly for transfer to the finishing molds. Thus any screw 103 may be adjusted for the purpose of taking up wear upon the cam 105 or the roller 104, or for the purpose of varying the amount of dip of any suction unit into the gathering pool independently of other units and independently of the adjustment of the transfer position of the said suction unit. The parison mold table may be rotated by any suitable means, as for example, by the gear wheel 106 which may be driven, if desired, by the shaft which drives the gear wheel 20.

A take-out table 115 is shown adjacent to the finishing mold table for receiving the ware taken out by the tongs 31—31a and carries a cam arm 116, which is arranged to transfer the completed ware, such as is shown at B, from the take-out table 115 to a buck 117 for transporting the said ware to a lehr.

In the operation of the embodiment of my invention illustrated, the parison molds travel continuously with the rotating parison mold table 12 in a generally horizontal plane, each mold being raised at the proper times to clear the walls of the gathering pot. While passing over the gathering pot, each mold is lowered to the level of the glass therein and then suction is applied to the combined head 90 to fill the suction mold with glass. The mold is then carried by the continued rotation of the table 12 to a point adjacent to the finishing mold table and the mold halves are opened leaving the parison held between the mold head and the bottom plate. The transfer tongs are projected outward on the table 13 by the operation of the cam mechanism associated with the cam path 38, being held open by the cam mechanism associated with the cam path 51, the carriage 28 sliding in the guideway between rollers 27 and the groove 72 resiliently guiding the substantial radial movement of the tongs. The centering head 70 engages the mold head 90 and aligns the tongs exactly with the parison held between the mold head and the bottom plate, the springs 73 and 74 allowing the necessary acceleration or retardation of the movement of the tongs relative to the table 13 to accommodate their movement to the movement of the parison mold 77. The cam mechanism associated with the cam path 51 allows the spring 69 resiliently to close the tongs members around the parison and the bottom plate 95 drops away. The tongs members are then retracted through the operation of the cam mechanism associated with the cam path 38 and the tongs members carry the parison to a position in exact alignment with the finishing mold, being positioned exactly with respect to the finishing mold by means of the slot 75. The finishing mold 109—110 is then closed about the parison and the cam mechanism associated with the cam path 51 causes the tongs to release the parison for travel in the finishing mold. The finishing mold continues its rotation about the finishing mold table 13 and the blow head 114 descends to cooperate therewith to complete the formation of the glassware article. As the mold approaches the take-out position the blow head 114 is lifted, the blow molds open, the tongs members are lowered by action of the cam mechanism associated with the cam path 46 and the tongs are closed about the finished articles of glassware by the spring 69, this closing being allowed by the cam mechanism associated with the cam path 51. The tongs are then raised by the cam mechanism associated with the cam path 46 to withdraw the finished article from the bottom plate and are projected by the cam mechanism associated with the cam path 38 to carry the finished article to a position over the take-out table 115. The cam mechanism associated with the cam path 51 then opens the tongs members to allow the finished article to be deposited upon the said take-out table and to be carried by the rotation of the table 115 to a position adjacent the buck 117 where it may be caused to move onto the buck by the cam arm 116.

While I have shown my transfer device as applied to tables of the continuously rotating type, it is also useful as a transfer in a machine of the intermittent type, inasmuch as the necessary exact positioning of the transfer device relative to the parison mold and the finishing mold may be more easily secured and maintained thereby than by previously existing methods and apparatus.

For purposes of illustration, I have shown an apparatus designed for the formation of glassware of the "semi-wide mouth variety", but the apparatus may obviously be arranged without any material alteration for the formation of glass articles of the "narrow neck" type, inasmuch as the molds are divided into halves, capable of opening to release the parisons held therein and inasmuch as the parisons are held between the head and bottom plate of the parison mold until grasped by the transfer apparatus.

It is to be understood that the above described embodiment of my invention is for the purpose of illustration only and various changes may be made therein, without departing from the spirit or scope of the invention.

I claim as my invention:

1. In apparatus for making glassware, a rotating parison mold table, a parison mold carried by the said table, a rotating finishing mold table, a finishing mold carried by said table, means for continuously rotating said tables, unitary means mounted upon said finishing mold table for transferring parisons from the parison mold to the finishing mold and for transferring finished glass articles from the finishing mold, and means for causing said unitary means to move in a path about the axis of the parison mold table to receive parisons from said parison mold.

2. In glassware making apparatus, a rotating parison forming table, a parison forming mechanism carried by the said table, a rotating finishing mold table, a finishing mold carried by the said table, and means mounted upon said finishing mold table for transferring a parison from the parison mold to the finishing mold, said last-named means including means for grasping the parison, and a guide mounted upon the said transfer means for contacting with a part of the parison forming mechanism to maintain the said grasping means exactly in register with the path of travel of the parison forming mechanism coincidentally with the movement of said parison forming mechanism along the said path.

3. In apparatus for making glassware, a continuously rotating parison mold table, parison molds carried thereby, a continuously rotating finishing mold table, finishing molds carried thereby, means for transferring glass parisons from the parison molds to the finishing molds, said transfer means comprising holding devices adapted to be brought into holding engagement with the glass parisons and to transfer said parisons to the finishing molds, said holding devices being mounted both for linear and oscillatory movement upon one of said tables and resiliently held against oscillation throughout part of their operation, and means for causing horizontal linear and oscillatory movement of each holding device relative to the table on which it is mounted, whereby the holding device will follow the path of movement of a mold on the other table coincidentally with the latter.

4. In apparatus for making glassware, in combination, a continuously moving horizontal parison mold carrier, a parison mold thereon, a continuously moving finishing mold carrier eccentric to said parison mold carrier, a finishing mold on said second carrier, means movably mounted upon said finishing mold carrier for transferring articles from the parison forming mechanism to the finishing mold, and cooperative guide means on the parison mold carrier and transfer means for causing the transfer means to be guided at times by the movement of the guide means on the parison mold carrier.

5. In apparatus for making glassware, in combination, a continuously moving parison mold, parison holding means associated therewith, a continuously moving finishing mold, a transfer apparatus, means for opening the parison mold to leave a parison supported by said holding means, means including a member moving with the parison mold for positioning the transfer apparatus relative to said parison mold to receive the parison from the holding means, and means moving with the finishing mold for positioning the transfer apparatus relative to said finishing mold to deliver the parison thereto.

6. In glassware making apparatus, in combination, a continuously rotating horizontal table, a parison mold carried by said table, a second table rotating continuously in a direction opposite to the direction of rotation of the first table, a finishing mold carried by said second table, means for transferring a parison in neck up position from the parison mold to the finishing mold, means for positioning and holding the transfer means for travel with the parison mold about the axis of the parison mold table when coacting with the parison mold, and means on the finishing mold table for positioning and holding the transfer means for travel with the finishing mold about the axis of its table when coacting with the finishing mold.

7. In apparatus for making glassware, in combination, a continuously rotating horizontal parison mold table, a parison forming mechanism mounted upon said table, a continuously rotating finishing mold table, a finishing mold mounted upon said finishing mold table, means for rotating said tables continuously in opposite directions, means for transferring an article in neck up position from the parison forming mechanism to the finishing mold, means for positioning the transfer means with respect to the finishing mold for travel in axial alignment therewith, while coacting with the finishing mold, and means for causing the transfer means to be guided at times by a part of the parison forming mechanism to follow the path of said parison coincidentally therewith.

8. An apparatus for making glassware, in combination, a continuously moving parison mold table, a parison forming mechanism upon said table, a continuously moving finishing mold table, a finishing mold mounted upon said table, means for transferring an article from the parison mold to the said finishing mold, means for contacting with a part of the parison forming mechanism to position the transfer means with respect to the said parison forming mechanism while coacting therewith, means mounted upon the finishing mold table for positioning the transfer means with respect to the finish mold, while coacting therewith, said positioning means comprising a member having a slot provided with resilient side walls for part of its length, and a movable transfer member arranged to be guided by said slot, a cam mechanism for moving the transfer means radially of the finishing mold table and a cam mechanism for causing the transfer means to grasp and release the articles to be transferred.

9. In apparatus for making glassware in which the glass is formed into a parison and the parison is subsequently formed into a finished article of glassware, a continuously rotating parison mold table, a plurality of parison forming mechanisms mounted upon the said table, a continuously rotating finishing mold table, a plurality of finishing molds mounted upon the said finish mold table, a plurality of transfer tongs movably mounted upon the said finishing mold table, each of said transfer units being adapted to coact with one finishing mold and one parison forming mechanism, means for causing said transfer tongs to be guided by a part of the parison forming mechanisms to follow the path of the said parison forming mechanisms in coincidence with the latter, means comprising a cam for moving the transfer tongs radially of the finishing mold table, means comprising a slotted part of the finishing mold table for guiding the movement of the transfer tongs radially of the said finishing mold table and for periodically positioning the said transfer unit relative to the finishing mold, means comprising a cam for moving the transfer unit vertically to raise or lower the glass article, and means comprising a cam for opening and closing the said transfer tongs to grasp and release the said parison.

10. In a glass forming machine, the combination of continuously rotating parison and finishing mold carriers, said carriers arranged side by side and spaced apart, parison molds and finishing molds carried by their respective carriers, the parison molds being adapted to receive charges of glass, means to shape the glass in the parison molds, means to open the parison molds, mechanism to transfer the charges of glass from the open parison molds to the finishing molds, means to close the finishing molds around the glass, said transfer mechanism comprising holding devices brought into holding engagement with the charges of glass before the release thereof by the parison shaping mechanism for transferring them to the blow mold, means for mounting said holding devices for horizontal oscillation and reciprocation on one of said carriers, resilient means yieldingly holding said devices against oscillation throughout part of their operation, and means separate from the molds for causing a relative oscillation and reciprocation of each holding device and the carrier on which it is mounted, whereby the holding device periodically will move in coincidence with a mold on the other carrier and without movement of translation relative to said mold.

11. In a glass forming machine, the combination of a parison mold carriage, a parison mold thereon, a finishing mold carriage, a finishing mold thereon, means to rotate said carriages continuously in opposite directions about vertical axes, a combined parison holding and transferring device and take-out, means for actuating said combined device to transfer a parison from the parison mold to the finishing mold, means for actuating said combined device to transfer a finished article from the finishing mold, mechanism having permanent operating connections with the finishing mold carriage for movably supporting said combined transfer device and take-out, and means for causing said combined transfer device and take-out to travel in register with the parison mold during the travel of the latter through a predetermined arc.

12. In a glass forming machine, the combination of a parison mold carriage, and a finishing mold carriage arranged side by side, parison forming mechanisms and finishing molds carried by said carriages, respectively, means for continuously rotating said carriages in opposite directions in synchronism about vertical axes, transfer mechanisms having permanent operating connection with the finishing mold carriage and operable to transfer the parisons from the parison forming mechanisms to the finishing molds, each of said transfer mechanisms comprising means brought into holding engagement with the glass articles before they leave the parison forming mechanism for holding the parisons and carrying them into position to be inclosed in the finishing mold, and means for causing said holding means to travel with the parison mold carriage in an arc concentric to the axis of the parison mold carriage a predetermined distance coincidentally with the travel of the parison forming mechanism through the same arc while mutually holding the parison.

13. In apparatus for making glassware, a continuously rotating parison mold table, a plurality of parison molds carried thereby and having neck molds formed integrally therewith, a continuously rotating finishing mold table, a plurality of finishing molds carried thereby, a plurality of transfer means also carried by the finishing mold table, parison supports associated with said parison mold for supporting parisons after the molds are opened, means for causing each of said transfer means to remove a parison from its support and to transfer the parison from the parison mold table to a finishing mold on the finishing mold table and to coact with the same finishing mold to remove finished ware therefrom.

14. In apparatus for making glassware, a parison mold having a neck ring integral therewith, a bottom plate for said parison mold, a head for said parison mold, means for opening the said mold while maintaining the bottom plate and head in position whereby the parison is held between the bottom plate and head, means comprising tongs for grasping the parison while held between the said bottom plate and head, a finishing mold, and means for moving the said tongs to transfer the parison from the parison mold to the finishing mold.

15. A glassware forming machine comprising a blank mold table, a blank mold thereon, a blow mold table adjacent but eccentric to the blank mold table, a blow mold thereon, means for continuously rotating the tables, ware holding means for transferring a blank from the blank mold to the blow mold, means for supporting said ware holding means for inward and outward movement relative to one of said tables, means for moving the ware holding means outwardly of its table into vertical alignment with the mold on the other table, guiding means associated with said other table, and guided means associated with the ware holding means arranged to engage the guiding means to maintain the said alignment of the ware holding means and mold as they travel together.

16. Glassware handling machinery comprising a horizontal mold table mounted for rotation about a vertical axis, a glassware shaping mold thereon, means for rotating said table, a glassware carrying mechanism positioned laterally of said table, means for moving said mechanism, means for transferring an article of glassware shaped in the mold on said table to said carrying mechanism comprising a ware-holding member, means for supporting said member for rectilinear and horizontal oscillatory motions, means for imparting both rectilinear and horizontal oscillatory motions to said ware-holding member, and means for timing the operation of the last-named means, whereby said ware-holding member is caused to travel first in alignment with and in the direction of travel of the mold on said table and then to travel above, and in vertical alignment with a point on, the ware-carrying mechanism while said mold and ware-carrying mechanism are moving.

17. A glassware forming machine comprising a horizontal mold table mounted for rotation about a vertical axis, a parison forming unit mounted on said table, a finishing mold table mounted for rotation about a vertical axis eccentric to the axis of the parison mold table, a finishing mold thereon, means for rotating said mold tables, and means for transferring a parison from the parison forming unit on the one table to a finishing mold on the other table while said tables are rotating, said means including a ware-holding member supported for movement above one of said tables, and means for horizontally moving said ware-holding member outwardly of its table and also for oscillating said ware-holding member to cause such a resultant movement thereof that the ware-holding member is caused to travel in vertical alignment with and in the direction of travel of the mold on the other table.

Signed at Hartford, Connecticut, this 27th day of March, 1929.

ROBERT W. CANFIELD.